US012594636B2

(12) United States Patent
   Kitamura

(10) Patent No.: US 12,594,636 B2
(45) Date of Patent: Apr. 7, 2026

(54) MACHINING CENTER

(71) Applicant: KITAMURA MACHINERY CO. LTD., Toyama (JP)

(72) Inventor: Akihiro Kitamura, Toyama (JP)

(73) Assignee: KITAMURA MACHINERY CO., LTD., Takaoka (JP)

( * ) Notice: Subject to any disclaimer, the term of this patent is extended or adjusted under 35 U.S.C. 154(b) by 569 days.

(21) Appl. No.: 18/318,372

(22) Filed: May 16, 2023

(65) Prior Publication Data

US 2024/0278367 A1 Aug. 22, 2024

(30) Foreign Application Priority Data

Feb. 20, 2023 (JP) ................................. 2023-024395

(51) Int. Cl.
   *B23Q 3/157* (2006.01)
   *B23Q 7/04* (2006.01)
   (Continued)

(52) U.S. Cl.
   CPC ............ *B23Q 11/0891* (2013.01); *B23Q 7/10* (2013.01); *B23Q 7/1431* (2013.01);
   (Continued)

(58) Field of Classification Search
   CPC ............. Y10T 29/5196; Y10T 29/5124; Y10T 409/30532–305432;
   (Continued)

(56) References Cited

U.S. PATENT DOCUMENTS 5,281,194 A * 1/1994 Schneider .......... B23Q 3/15536
                                                      483/62
8,474,117 B2 7/2013 Kuriya et al.
   (Continued)

FOREIGN PATENT DOCUMENTS

CN          109454493 A       3/2019
CN          111531728 A       8/2020
                     (Continued)

OTHER PUBLICATIONS

Machine Translation of FR 2955798 A1, which FR '798 was published Aug. 5, 2011.*
   (Continued)

*Primary Examiner* — Erica E Cadugan
(74) *Attorney, Agent, or Firm* — BACON & THOMAS, PLLC

(57) ABSTRACT

A machining center is provided, which can complete replacement of processed works on stock shelves in a work storage section with unprocessed works within a time period significantly shorter than those in conventional techniques and improve the efficiency of an entire processing process. In the machining center, a cover surrounding the work storage section includes an opening portion where rear surface regions of the stock shelves are exposed, a stock shelf access door that closes the opening portion and is driven to be opened and closed, a locking device for the stock shelf access door, a unlocking mechanism that is operable from the outer side of the cover to unlock the locking device, and a door opening/closing detection device that detects an opened or closed state of the stock shelf access door. A control unit of a CNC device includes an interlocking function of disabling the unlocking mechanism while an automatic pallet changer is driven, and a safety control function of prohibiting, based on a detection signal from the door opening/closing detection device, a drive unit
   (Continued)

of the automatic pallet changer from being driven while the stock shelf access door is in the opened state.

5 Claims, 5 Drawing Sheets

(51) Int. Cl.

| | |
|---|---|
| *B23Q 7/10* | (2006.01) |
| *B23Q 7/14* | (2006.01) |
| *B23Q 11/00* | (2006.01) |
| *B23Q 11/08* | (2006.01) |
| *B23Q 17/00* | (2006.01) |
| *G05B 19/406* | (2006.01) |

(52) U.S. Cl.
CPC ...... *B23Q 11/0085* (2013.01); *B23Q 11/0089* (2013.01); *B23Q 17/007* (2013.01); *G05B 19/406* (2013.01); *B23Q 3/15713* (2013.01); *Y10T 29/5196* (2015.01); *Y10T 409/30392* (2015.01); *Y10T 409/306048* (2015.01); *Y10T 483/115* (2015.01); *Y10T 483/16* (2015.01)

(58) Field of Classification Search
CPC .................. Y10T 409/306048–306104; Y10T 483/16–165; B23Q 1/66; B23Q 7/1426–1494; B23Q 7/10–106; B23Q 2707/06; B23Q 11/08–11/0891; B23Q 11/0078; B23Q 11/0085; B23Q 11/0089
USPC ......... 29/33 P, 563; 409/159–161, 172–173; 483/14–15; 198/345.3, 346.1
See application file for complete search history.

(56) References Cited

U.S. PATENT DOCUMENTS

| | | | |
|---|---|---|---|
| D1,021,982 S * | 4/2024 | Kitamura | ..................... D15/122 |
| 2004/0079617 A1 * | 4/2004 | Bernhard | ............. B23Q 7/1431 |
| | | | 198/346.1 |
| 2017/0300031 A1 * | 10/2017 | Bernhard | ............. G05B 19/402 |
| 2019/0202015 A1 | 7/2019 | Maenosono et al. | |

FOREIGN PATENT DOCUMENTS

| | | | |
|---|---|---|---|
| CN | 112496837 A | | 3/2021 |
| CN | 113639702 A | | 11/2021 |
| DE | 10 2013 005 474 A1 | | 10/2014 |
| DE | 10 2018 211 023 A1 | | 1/2020 |
| EP | 1 604 775 B1 | | 3/2005 |
| EP | 2 145 724 B1 | | 4/2011 |
| FR | 2955798 A1 | * | 8/2011 |
| JP | 06-075637 A | | 3/1994 |
| JP | 10-053329 A | | 2/1998 |
| JP | H 10217061 A | | 8/1998 |
| JP | 2010-280042 A | | 12/2010 |
| JP | 2017-193045 A | | 10/2017 |
| JP | 2020-069562 A | | 5/2020 |
| JP | 7732700 B1 | * | 9/2025 |

OTHER PUBLICATIONS

Search Report dated Oct. 27, 2023 issued in corresponding European application No. 231 72003.8.
Office Action / Search Report issued on Aug. 28, 2025, in corresponding Taiwan application No. 11420912670.
Decision dated Oct. 30, 2023 issued in corresponding Japanese application No. JP2023-024395.

* cited by examiner

FIG. 7A
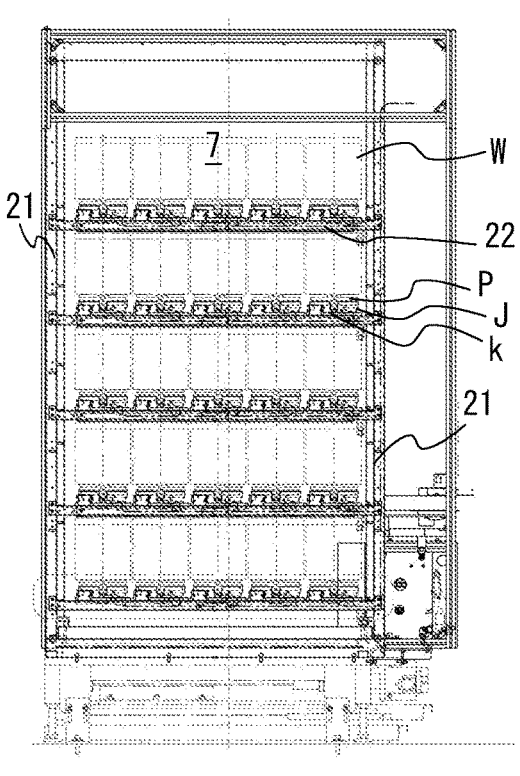
FIG. 7B
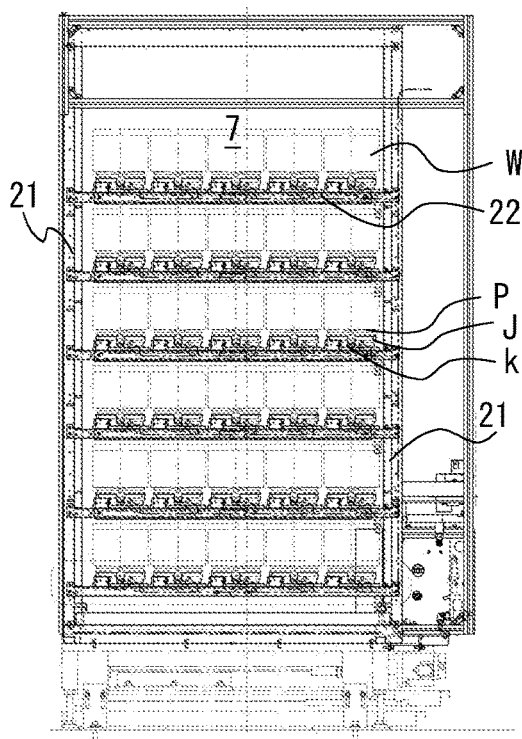
FIG. 7C
FIG. 7D
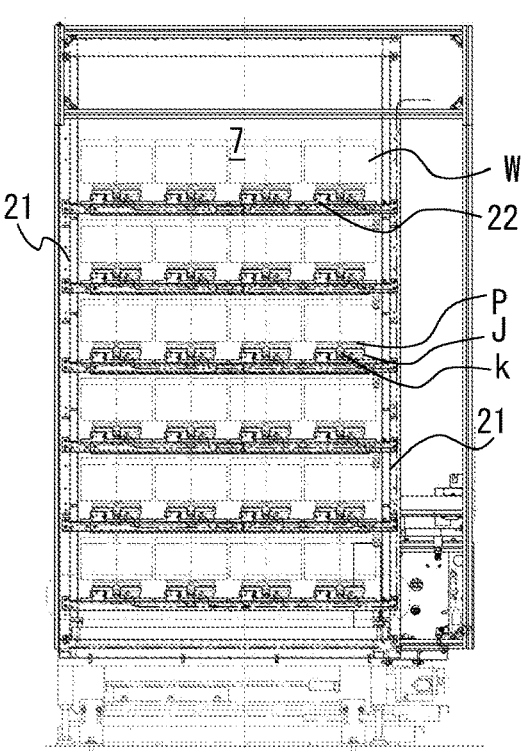

US 12,594,636 B2

MACHINING CENTER

BACKGROUND OF THE INVENTION

The present invention relates to a machining center that includes a work storage section including stock shelves arranged at a plurality of stages and provided for storing a plurality of pallets with works fixed thereto and to be processed, and in which the pallets are loaded and unloaded by an automatic pallet changer between the stock shelves and a processing table in a processing section of a machine tool, and more particularly to the machining center having a configuration capable of directly accessing the stock shelves without a setup table.

Many recent machine tools have an automatic tool replacement function of replacing tools between a magazine storing various tools and a rotary spindle in the processing section, include a computer numerical controller, that is, a so-called computerized numerical control (CNC) device, and are controlled and driven as machining centers. In such the machining center, cutting processing is performed according to a predetermined NC processing program while tools are automatically replaced by controlling a machine tool body by a CNC device. Therefore, products in various forms are formed by using various NC processing programs in an automatic operation of the machine tool.

In addition, there is the machining center having a configuration in which the work storage section is provided adjacent to the processing section, and a plurality of works stored on each of a plurality of stock shelves arranged in the work storage section are automatically loaded to and unloaded from the processing section by the automatic pallet changer. This type of machining center is particularly suitable for continuously performing cutting processing on a large number of works, and is intended to further automate an entire manufacturing process.

A general automatic pallet changer transports works in units of the pallets with works fixed thereto by bolting or the like. The Pallets are fitted to and seated on each stock shelf such that the pallets can be removed from the stock shelves. Each of the stock shelves has a plurality of pallet storage jigs for supporting works fixed to the pallets. The CNC device drives and controls the automatic tool changer and the machining table and drives and controls the automatic pallet changer. In this way, the processing process in the processing section and the process of unloading and loading works from and onto the processing table are automatically repeated in coordination with each other.

Normally, the automatic pallet changer includes an arm for detachably holding a pallet, and the arm turns around the vertical axis of the automatic pallet changer, moves in a vertical direction, and extends and contracts in the horizontal direction. The driving and control of this automatic pallet changer allow the arm to enter the processing section of the machine tool body, remove the pallet with a processed work fixed thereto from the processing table, unloads the pallet from the processing section to the outside of the processing section, return the pallet to an empty work storage jig on a stock shelf, hold and take out the pallet with an unprocessed work fixed thereto from the another pallet storage jig on the stock shelf, load the pallet into the processing section, and fix the pallet to the processing table. When the pallet is fixed to this processing table, cutting processing is performed on the unprocessed work fixed to the pallet according to a predetermined processing program.

As described above, the process of replacing works in units of the pallets is repeated between the stock shelves in the work storage section and the processing table in the processing section, and the unprocessed works are sequentially loaded into the processing section and the processed works are unloaded from the processing section such that the unprocessed works are replaced with the processed works on all the stock shelves.

As a form of the work storage section and the automatic pallet changer, the automatic pallet changer has a strut that extends in the vertical direction and can rotate around its central axis, and the arm that turns around the central axis, the stock shelves are arranged at the plurality of the stages in the vertical direction, and each of the stock shelves is formed in an arc around the central axis of the automatic pallet changer in general. Therefore, distances from the central axis of the automatic pallet changer to each of the pallet storage jigs on each of the stock shelves are the same and the automatic pallet changer turns around the central axis to cause the arm to efficiently access each of all the pallet storage jigs on each of the stock shelves. The setup table is provided at a position on the extension line of the arc of the stock shelves. The automatic pallet changer is designed with a turning angle range in which the arm can reach the setup table (for example, see Japanese Patent Unexamined Publication No. 2010-280042).

On the setup table, works are fixed (set up) to and removed from the pallets. That is, the processed work designated by the CNC device is taken out from the stock shelf of the work storage section and loaded onto the setup table by the arm of the automatic pallet changer, and is removed from the pallet on the setup table and collected outside. In addition, the pallet with the unprocessed work fixed thereto is transported to an empty storage jig on the stock shelf. Therefore, the works are collected or supplied one by one from or to the setup table in units of the pallets.

In general, in the machining center, at least the processing section is surrounded by a cover that is a so-called splash guard and provided for preventing cutting waste, cutting fluid, and the like generated during cutting processing from scattering to the outside. When such the work storage section as described above is provided, the work storage section adjacent to the processing section is also integrally surrounded by the cover. In the cover, a work loading/unloading door that allows the arm of the automatic pallet changer to enter and exit is disposed at a boundary surface between the processing section and the work storage section.

According to the NC processing program for continuously processing a large number of works, the CNC device drives and controls the work loading/unloading door and the automatic pallet changer in order to coordinate opening and closing of the work loading/unloading door with loading and unloading of the pallet on which a work is fixed to and from the processing table by the arm of the automatic pallet changer, for each work. In many machining centers, a control panel with a display and an input unit for the CNC device is provided on an outer surface of the cover.

SUMMARY OF INVENTION

As a process of processing a work by the machining center having the work storage section including the automatic pallet changer, processing of continuously cutting a large number of works that exceed the total storage number of the stock shelves in the work storage section may be performed. In this case, after all works originally stored on the stock shelves are replaced with the processed works, it is necessary to collect the processed works and newly supply the unprocessed works to the stock shelves.

However, in the conventional machining center, it was necessary to take out the processed works from the stock shelves and supply the unprocessed works one by one on the setup table, and it took a long time to replace the works on the entire stock shelves. Therefore, a waiting period until the start of the next continuous processing process is also lengthened, which adversely affects the efficiency of the entire process of processing a predetermined large number of the works.

In view of the above-described problems, an object of the present invention is to provide the machining center that can complete, in a shorter time than before, the replacement of the processed works with the unprocessed works after the works originally stored on the stock shelves are processed, even when a large number of the works that exceed the capacity of the stock shelves in the work storage section are to be continuously processed, and to improve the efficiency of the entire processing process.

To achieve the above-described object, according to the present invention, the machining center includes a computerized numerical control (CNC) device that performs numerical control on the machine tool and an automatic tool changer. In the machining center, the processing section of the machine tool and the work storage section provided adjacent to the processing section are integrally surrounded by the cover. In the processing section, a processing table to which the works to be processed are fixed via the pallets, and a rotary spindle to which various tools that perform cutting processing on the works fixed to the processing table are attached by the automatic tool changer such that the various tools can be replaced are disposed. The work storage section includes the automatic pallet changer that loads and unloads the works to and from the processing table in units of the pallets to which the works are fixed, the stock shelves that are disposed at the plurality of the stages in a region facing the processing section with the automatic pallet changer interposed therebetween, and on which the plurality of the pallets are removably stored, and the setup table that is disposed near one end of each of the stock shelves at the plurality of the stages in a longitudinal direction of each of the stock shelves and on which the works are fixed to and removed from the pallets and taken in and out from the outside. The computerized numerical control device includes a control unit being configured to drive and control drive units of the processing table and the rotary spindle and the automatic tool changer according to a predetermined processing instruction to execute cutting processing on a processing material while replacing a tool with a certain tool and attaching the certain tool to the rotary spindle according to each processing process indicated in the processing instruction. And the control unit being configured to drive and control the automatic pallet changer to execute replacement of work by unloading the pallet to which the processed work is fixed and loading the pallet to which the unprocessed work is fixed between the stock shelves at the plurality of the stages and the processing table. The control panel for the computerized numerical control device is disposed on an outer surface of the cover in the vicinity of the processing section.

The cover includes an opening portion where rear surface regions of the stock shelves at the plurality of the stages are exposed to a region located on the rear side of the stock shelves at the plurality of the stages and facing the automatic pallet changer in a region surrounding the work storage section, a stock shelf access door that closes the opening portion and is driven to be opened and closed, a locking device that stops the opening and closing driving of the stock shelf access door, an unlocking mechanism that is operable from the outside of the cover and releases the stop by the locking device, and a door opening/closing detection device that detects an opened or closed state of the stock access door and outputs a detection signal.

The control unit is configured to further include an interlocking function that enables the unlocking mechanism while the automatic pallet changer is stopped, and disables the unlocking mechanism while the automatic pallet changer is driven, and a safety control function that determines, based on the detection signal, whether the stock shelf access door is in the opened state or the closed state, and prohibits a drive unit of the automatic pallet changer from being driven when the stock shelf access door is in the opened state.

According to the machining center having the above-described configuration according to the present invention, an operator can open the stock shelf access door while the automatic pallet changer is stopped and directly load and unload the work onto and from the stock shelf from the exposed opening portion. Therefore, in a case where a large number of the works that exceed the capacity of all the stock shelves are to be continuously processed, an operation of replacement with the unprocessed works after the works originally stored on the stock shelves are replaced with the processed works can be performed at once from the rear surface side of the stock shelves, and it takes less time than before. Particularly, when the opening portion has a large area that exposes the entire rear surface regions of the stock shelves, it is possible to replace all the works stored on all the stock shelves at once.

Therefore, according to the present invention, a waiting period until the start of the next continuous processing process which is determined based on the time required for a work replacement operation can be significantly shortened, as compared with the conventional techniques. As a result, the efficiency of all processing processes until the completion of processing on all many works is significantly improved as compared with the conventional machining center in which the works are replaced one by one only on the setup table.

The stock shelf access door according to the present invention is locked while being closed by the locking device during the operation of the machining center. And the interlocking function of the control unit disables the unlocking mechanism during the driving of the automatic pallet changer, and enables the unlocking mechanism when the automatic pallet changer is stopped. In the active state of the unlocking mechanism, the stock shelf access door can be opened. Therefore, after all the works originally stored on all the stock shelves are replaced with the processed works, when the unlocking mechanism unlocks the locking device at a timing when the driving of the automatic pallet changer is stopped, the stock shelf access door can be opened and an operation of replacing the works can be safely performed.

In addition, according to the present invention, since the safety control function of the control unit prevents the automatic pallet changer from being driven when the stock shelf access door is opened, interference between an operator and the automatic pallet changer in operation can be avoided during the operation of replacing the works, and the safety is ensured.

As the locking device according to the present invention, various methods can be used as long as the rotation of the stock shelf access door for opening and closing can be blocked such that the blocking can be released. As the stock shelf access door according to the present invention, a door frame is provided on an inner peripheral edge of the opening portion, and a simple swing door can be provided when a single door member or a pair of door members rotatable outward about a rotation axis is attached to the door frame via a hinge on one or both of the left and right sides of the door frame. In addition, a slidable door can be formed when rails can be provided parallel to each other at upper and lower portions of an outer peripheral edge of the opening portion, and by forming door members such that upper and lower edges of the door members are fitted to the upper and lower rails and are slidable. As the locking device in the opening and closing door structure, the locking device of an electromagnetic lock (solenoid lock) type is preferable.

The locking device of the electromagnetic lock type comprises an actuator that is fixed on the door side and displaced with the opening and closing of the door, and a device body that is inserted and removed by the displacement of the actuator. In the device body, a movable iron core (locking rod) provided at the center of a coil of a solenoid and capable of reciprocating is moved forward by a magnetic field force generated by energization and excitation of the solenoid, and is moved backward by a biasing force of a spring in a de-energized and non-excited state of the solenoid. The locking rod that has been moved forward fits into a recess of a cam member to block rotation of the cam member. In addition, when the locking rod is moved backward and the fitting to the recess of the cam member is released, the cam member becomes rotatable. On the other hand, when the actuator is inserted in the device body to rotate the cam member and position the cam member at an angle where the recess can be fitted to the locking rod, and the actuator is engaged with a protrusion of the cam member. Therefore, when the locking rod is fitted to the recess of the cam member to block the rotation of the cam member, the displacement of the actuator engaged with the protrusion of the cam member that cannot rotate is also blocked. Since the drive unit of the door is stopped by the actuator that cannot deform, the door is locked such that the door cannot be opened. According to the locking device, when the actuator is fixed to a drive unit of the door member of the stock shelf access door, and the device body is disposed around the door member at a position corresponding to the actuator, the locking device can be easily built in the present invention.

In the locking device of the electromagnetic lock type described above, the locked state can be released by switching the energized state of the coil constituting the solenoid to the de-energized state. Therefore, for example, when an opening/closing switch that is in a closed (ON) state is disposed in a power supply circuit for the solenoid, the unlocking mechanism can be constituted by an opening/closing (ON/OFF) mechanism for the opening/closing switch. The unlocking operation is preferably performed with a button operable from the outer side of the cover at a position in the vicinity of the stock shelf access door. The button is preferably a door opening button such that the opening/closing switch is switched off by an operation of pressing the button to disconnect the power supply circuit so as to form the de-energized state.

In this case, the interlocking function of the control unit may be any system as long as it can disable the unlocking by the operation of the door opening button. When the above-described electromagnetic lock type is used, the system blocks the transition from the energized state of the solenoid to the de-energized state. For example, the above opening/closing switch of the power supply circuit is a first opening/closing switch, a second opening/closing switch in a opened (OFF) state is disposed in a detour, and the control unit controls the opening and closing (ON/OFF) of the second opening/closing switch. This configuration is simple. Even when the first opening/closing switch is turned off by the operation of pressing the door opening button, the control unit turns on (closes) the second opening/closing switch during the driving of the automatic pallet changer so that the control unit can maintain the excited state of the solenoid by energizing the power supply circuit via the detour. Therefore, the locked state is maintained, that is, the unlocking operation is disabled. In addition, when the driving of the automatic pallet changer is stopped, the control unit turns off the second opening/closing switch to block the detour and enable the unlocking by the door opening button.

In addition, when the locking device is of the above-described electromagnetic lock type, it is convenient to use a safety switch that interoperates with the locking device as the door opening/closing detection device that detects the opened or closed state of the stock shelf access door. The safety switch supporting the solenoid locking includes a safety switch circuit having a normal close contact (NC contact) for a relay. In the energized state in which the NC contact is closed, an energization signal flows to the control unit. The safety switch includes a hooking rod that is pushed up and hooked by the force of the spring at a portion other than the fitting recess of the cam member to the locking rod when the actuator of the locking device is inserted in the device body and engaged with the cam member. After the cam member becomes rotatable in the unlocked state, the hooking rod is pressed downward against biasing force of the spring by the rotation of the cam member accompanying the displacement of the actuator pulled out from the device body. Since the downward pressing of the hooking rod opens the NC contact to form the de-energized state, the energization signal is blocked. While the control unit is detecting the energization signal from the safety switch, the control unit determines that the stock shelf access door is closed. When the control unit cannot detect the energization signal, the control unit can determine that the stock shelf access door is opened. Therefore, the control unit can use the energization signal from the safety switch as a detection signal to execute a safety control function of prohibiting the driving of the automatic pallet changer in a state in which the stock shelf access door is in the opened state.

The machining center according to the present invention includes the stock shelf access door that allows the works to be directly replaced at once on the assumption that a process of continuously processing a large number of the works in an efficient manner is performed. Therefore, it is desirable that the works be able to be stored on the stock shelves in the work storage section in an efficient manner. Therefore, in the present invention, the stock shelves at the plurality of the stages have the same outer rectangular shape, and the work storage section has a substantially box-like shape including a flat wall surface along a longitudinal side of each rectangular stock shelf on the rear surface side. And the region of the cover having the opening portion and the stock shelf access door is preferably present on the flat wall surface.

As described above, since each of the stock shelves has a long and narrow rectangular shape, instead of having a conventional circular arc shape, substantial intervals between adjacent works having the same shape in the longitudinal direction can be shorter than those in a case where the stock shelves have an arc shape, and the works can be more efficiently arranged side by side. The work storage section has the most efficient spatial shape, which is the substantial housing shape including the flat wall surface along the longitudinal side of each rectangle stock shelf on the rear surface side. In this case, since the region of the cover including the opening portion and the stock shelf access door is present on the flat wall surface, a constituent member of the stock shelf access door can be simply configured in the form of flat plate. In a case where the constituent member of the stock shelf access door is at least partially transparent or semi-transparent, even when the stock shelf access door is closed, it is possible to check the inside of the stock shelf access door. A specific door configuration of the stock shelf access door may be a general opening/closing door configuration. Although the stock shelf access door may be the slidable door or the swing door that is opened outward, a pair of swing (double-sided) doors is the simplest and most preferable since a movement space for the doors to the opened state is small.

As a configuration in which the rectangular stock shelves are disposed at the plurality of stages in the work storage section having the substantial box-like shape, the cover surrounding the work storage section can have a pair of inner wall surfaces facing parallel to each other between which the stock shelves are horizontally arranged in the longitudinal direction. Opposed short side portions of each stock shelf are detachably attached to the pair of inner wall surfaces at the same height via a pair of shelf attachment portions. The pairs of shelf attachment portions are formed at equal intervals in the vertical direction so that the stock shelves at the plurality of the stages can be arranged in parallel to each other. It is preferable that two or more types of equally spaced positions in the vertical direction at which the plurality of the combinations of pair of shelf attachment portions are formed be selectable and changeable. In this case, the width of a gap between the adjacent stock shelves in the vertical direction can be set to at least either a relatively narrow gap or a relatively wide gap. Therefore, the stock shelves at the plurality of the stages can be attached at suitable intervals in advance according to the height of the unprocessed work to be processed.

As specific shelf attachment portions, various mechanism can be used as long as the mechanisms can detachably hold the stock shelves to maintain the horizontally arranged states of the stock shelves. For example, vertical struts facing the pair of inner wall surfaces are provided, and a groove is formed in each of the vertical struts so that both short sides of each of the stock shelves are inserted and supported in the horizontal direction at the same height. This configuration is simple. In addition, the shelf attachment portions can be constituted by screw holes formed in the inner wall surfaces of the cover so that the short sides of each of the stock shelves can be fixed by screws. Not only one of these configurations but also both of the configurations may be employed to more reliably and stably support the stock shelves.

The automatic pallet changer loads a work while using the arm to detachably hold the pallet with the work fixed thereto. Therefore, when each of the stock shelves has a rectangular shape, the automatic pallet changer is preferably configured to move the arm in a left-right horizontal direction along the longitudinal direction of each stock shelf in order to efficiently take out or store the pallets from or on the stock shelves. That is, the automatic pallet changer preferably includes the arm for detachably holding the pallet, a turning drive mechanism for rotating the arm around the vertical axis, a lifting drive mechanism for moving the arm in the vertical direction along the vertical axis, a horizontal drive mechanism for moving the arm in the left-right direction along the longitudinal side of each stock shelf on the front surface side of the stock shelves, and a telescopic drive mechanism for moving the arm in a front-rear direction orthogonal to the longitudinal side.

In addition, as the drive mechanisms, motors that are driven and controlled in coordination with each other by the control unit may be used. In this case, the rotational motion of each of the motors is transmitted to an arm support portion such that the arm is moved in a driving direction for each purpose. The control unit controls the rotation amount and rotation direction of each of the motors so as to drive the arm by a movement amount in a movement direction at a turning angle in a turning direction in order to move the arm to a target position.

It is assumed that each of the stock shelves having a rectangular shape includes the pallet storage jigs disposed at equal intervals along the longitudinal direction. It is desirable that the pallet storage jigs be removably disposed at two or more types of selectable and changeable equal intervals. Therefore, according to a horizontal width of the work fixed to the pallet and to be processed, it is possible to select an interval in which the pallet can be efficiently stored on the stock shelf. That is, when the horizontal width of the work is relatively small, the pallet storage jigs are disposed at a relatively short interval on the stock shelf according to the relatively small width. When the horizontal width of the work is relatively large, the pallet storage jigs are disposed at a relatively long interval on the stock shelf according to the relatively large width.

The pallets and the pallet storage jigs may have configurations such that the arm of the automatic pallet changer can detachably hold the pallets. Specifically, each of the pallets includes a fitting protrusion protruding downward from a bottom surface of the pallet, and each of the stock shelves includes the plurality of the pallet storage jigs that are removably disposed at two or more types of selectable and changeable equal intervals along the longitudinal direction of the stock shelf and where pallets are seated. It is preferable that each of the pallet storage jigs include a fitting recess in which the fitting protrusion of any of the pallets is removably inserted such that the bottom surface of the pallet is supported by the fitting recess, an engagement portion detachably attached to the stock shelf, and an arm passage portion into which the arm of the automatic pallet changer is removably inserted such that the arm can move in the vertical direction to lift up the pallet. According to this configuration, each of the pallets can be easily lifted up and removed from the pallet storage jig by the arm, and can be lifted down by the arm to be seated on the jig for storage.

In addition, a mounting mechanism for mounting each of the pallet storage jigs on each of the stock shelves is not particularly limited as long as the pallet storage jigs can be removably fixed. However, it is desirable to use a simple configuration to easily fix and remove the pallet storage jigs. For example, as the engagement portion detachably attached to the stock shelf, a protruding engagement portion is disposed on the bottom surface of the pallet storage jig, and a through-hole in which the engagement portion is inserted is disposed in the stock shelf, and the engagement portion inserted in the through-hole is fixed by screwing from the rear surface side of the stock shelf. In this case, intervals between the pallet storage jigs can be easily changed by forming the through-holes at a plurality of types of equal intervals in the stock shelf.

The CNC device includes a storage unit storing various types of NC processing programs. In this storage unit, tool information including identification numbers of a plurality of tools stored in a tool storage section, materials and shapes of the tools associated with the identification numbers, and storage position information (addresses) of the tools are stored. In addition, when cutting processing is sequentially performed on the works while the automatic pallet changer automatically replaces the works, an APC (Automatic Pallet Change) program for driving and controlling the automatic pallet changer in coordination with the processing process is stored in the storage unit.

On the other hand, as described above, the number of stages of the stock shelves can be changed because it can be selected from a plurality of types of equal intervals with different vertically intervals. Also, the number of the pallet storage jigs disposed for each of the stock shelves can be changed because it can be selected from a plurality of types of equal intervals with different intervals along the longitudinal direction of the stock shelf. And when combinations of the numbers of the stages and the numbers of the pallet storage jigs arranged at the different intervals are different, the number of all the works stored in the same work storage section, the numbers of all the pallets, and the positions of the stored works and the stored pallets are different. Therefore, a plurality of the work arrangement patterns can be set. In this case, the address arrangement as the storage position of each work is different for each work arrangement pattern.

Therefore, it is preferable that, in the storage unit, a plurality of different selectable work arrangement patterns in the storage work section be stored. In this case, it is desirable that an APC program incorporating access route information be prepared and stored in the storage unit so that the automatic pallet changer can cause the arm to efficiently reach all addresses for each work arrangement pattern. The access route information may include numerical information such as a required horizontal movement amount and direction from a predetermined reference point to each address, a vertical movement amount and direction, a front-rear horizontal movement amount and direction, and the turning angle and direction around the vertical center axis, and a motor rotation amount and direction corresponding to each of the above-described movements and directions.

Therefore, the control unit can select and execute an APC program corresponding to a specified work arrangement pattern. That is, the control unit drives and controls the automatic pallet changer based on appropriate access route information according to the selected APC program in a time period from the end time of a process of processing a previous work to the start time of the process of processing a next work so as to transport and replace the processed and the unprocessed works between the processing table and the stock shelves while executing the predetermined NC processing program.

As described above, according to the present invention, since the stock shelf access door that exposes the rear surface region of each stock shelf and through which the works can be directly unloaded and loaded is included in the cover surrounding the work storage section of the machining center, the stock access door is opened and the processed works can be replaced with the unprocessed works at once within a short time period. Therefore, in a case where a large number of the works that exceed the total storage section of the stock shelves are to be continuously processed, an operation of replacing all the processed works on the stock shelves with the unprocessed works can be performed within the short time period. Therefore, a waiting time during which the processing process remains stopped is short and an effect of improving the efficiency of the entire processing process can be obtained, as compared with an operation of replacing the works using only a conventional setup table.

BRIEF DESCRIPTION OF THE DRAWINGS

FIGS. 1A and 1B are perspective views illustrating a schematic configuration of the machining center according to an embodiment of the present invention, while FIG. 1A illustrates a state in which the stock shelf access door is closed and FIG. 1B illustrates a state in which the stock shelf access door is opened.

FIGS. 7A to 7D are partial side views illustrating different work arrangement patterns in the work storage section of the machining center illustrated in FIG. 1 without illustrating the stock shelf access door, while FIG. 7A illustrates a work arrangement pattern of 5 rows and 5 stages, FIG. 7B illustrates the work arrangement pattern of 5 rows and 6 stages, FIG. 7C illustrates a work arrangement pattern of 4 rows and 5 stages, and FIG. 7D illustrates the work arrangement pattern of 4 rows and 6 stages.

DETAILED DESCRIPTION

Figure 1A:
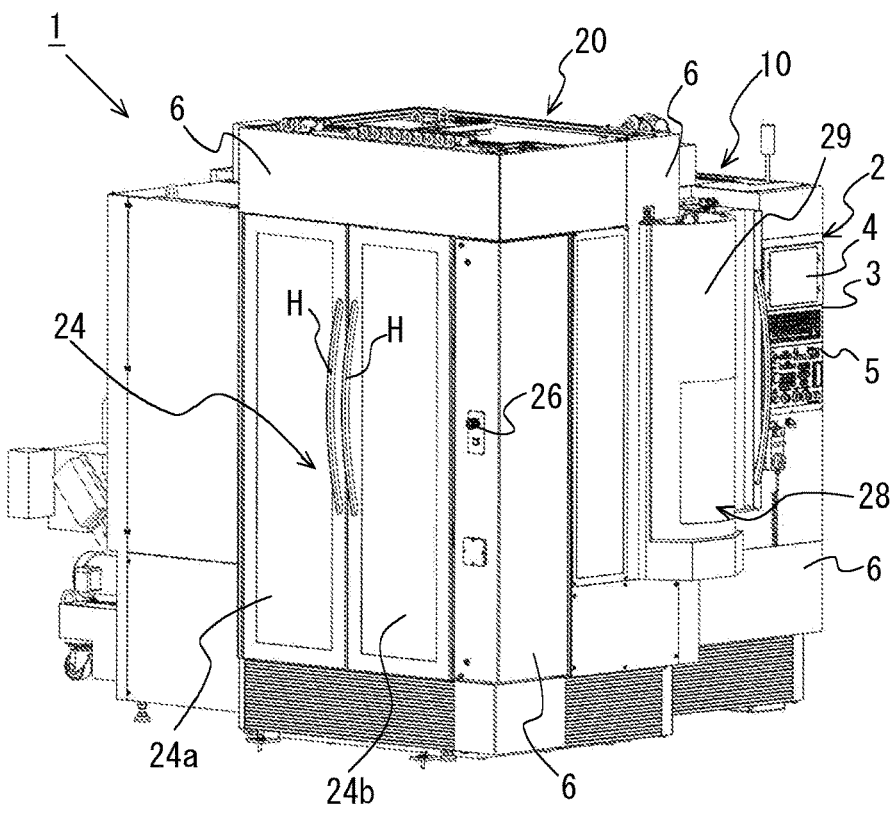
Figure 1B:
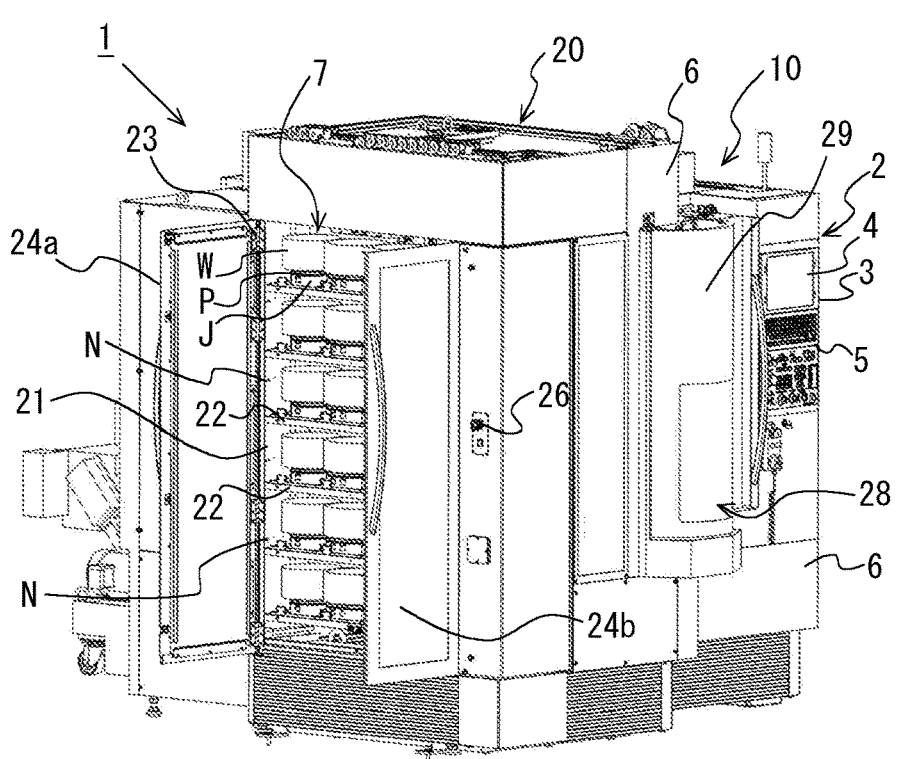
Figure 2:
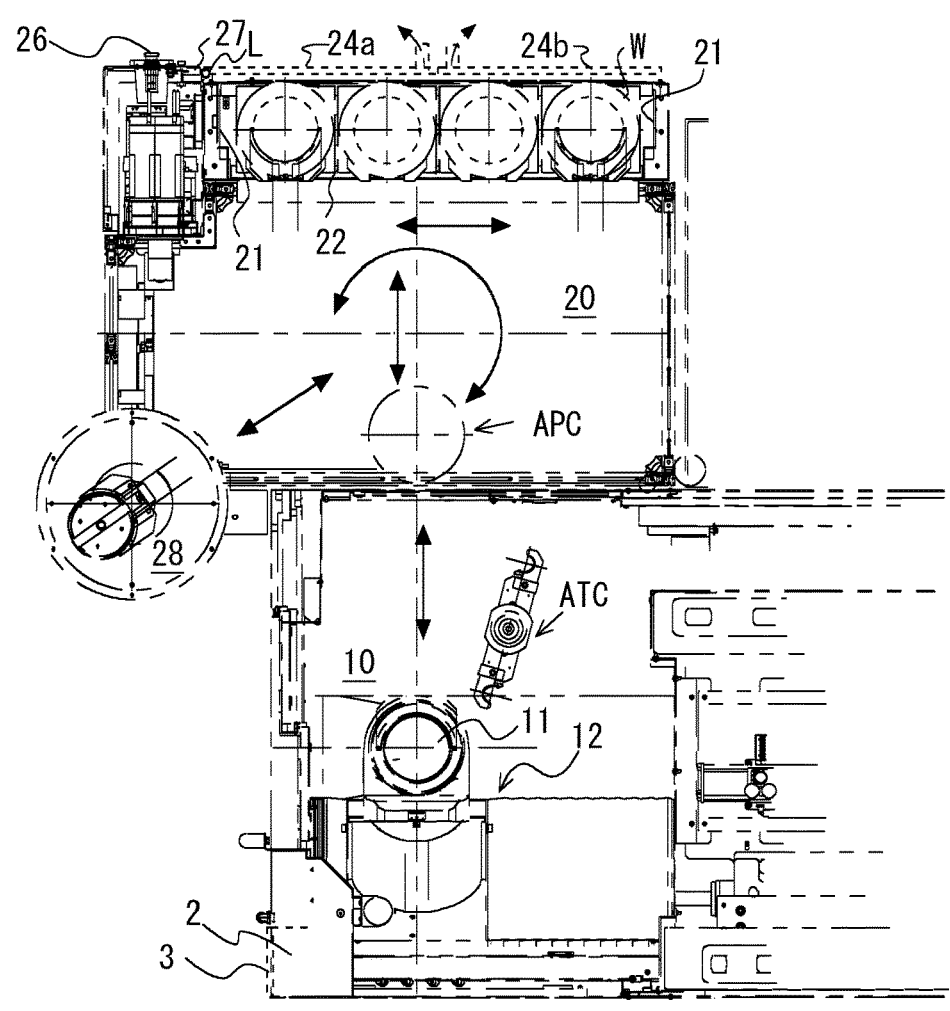
FIG. 2 is a schematic plan view illustrating the inside of a processing section and the work storage section of the machining center illustrated in FIG. 1 without illustrating the automatic pallet changer.
Figure 3:
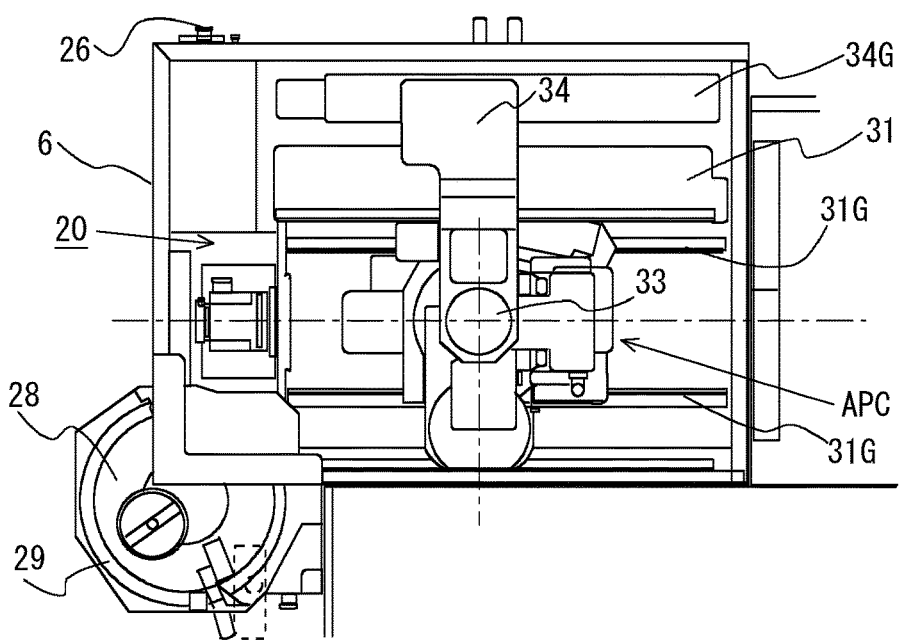
FIG. 3 is a plan view of the work storage section illustrated in FIG. 2 as viewed from above in a state in which the automatic pallet changer is arranged.
Figure 4:
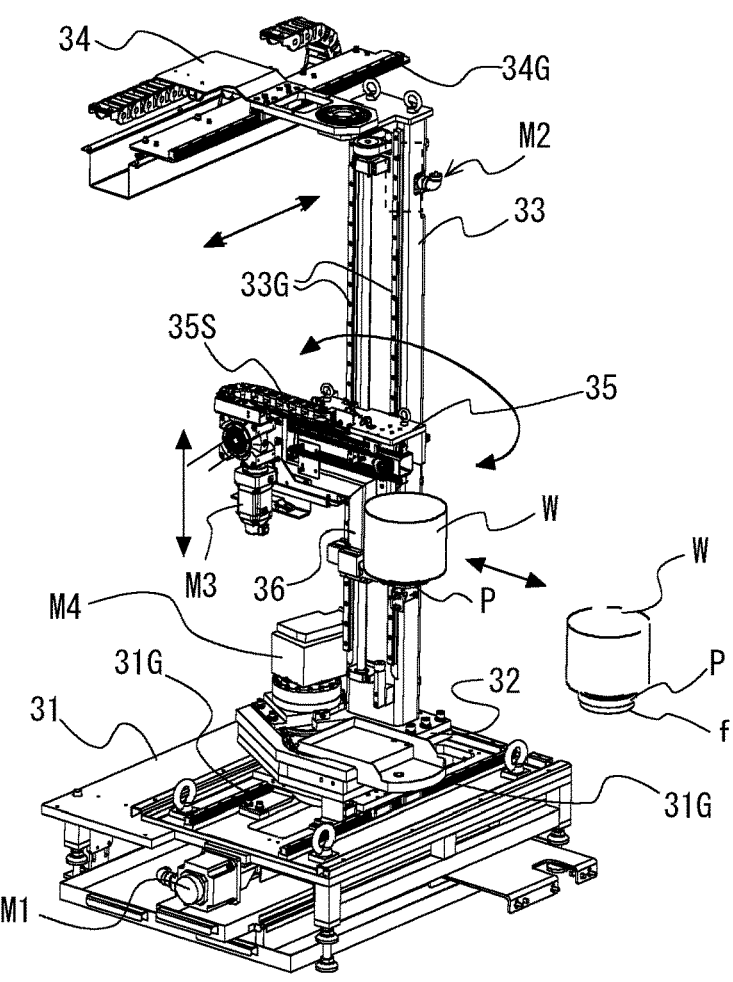
FIG. 4 is a perspective view illustrating a schematic configuration of the automatic pallet changer according to the embodiment.
Figure 5:
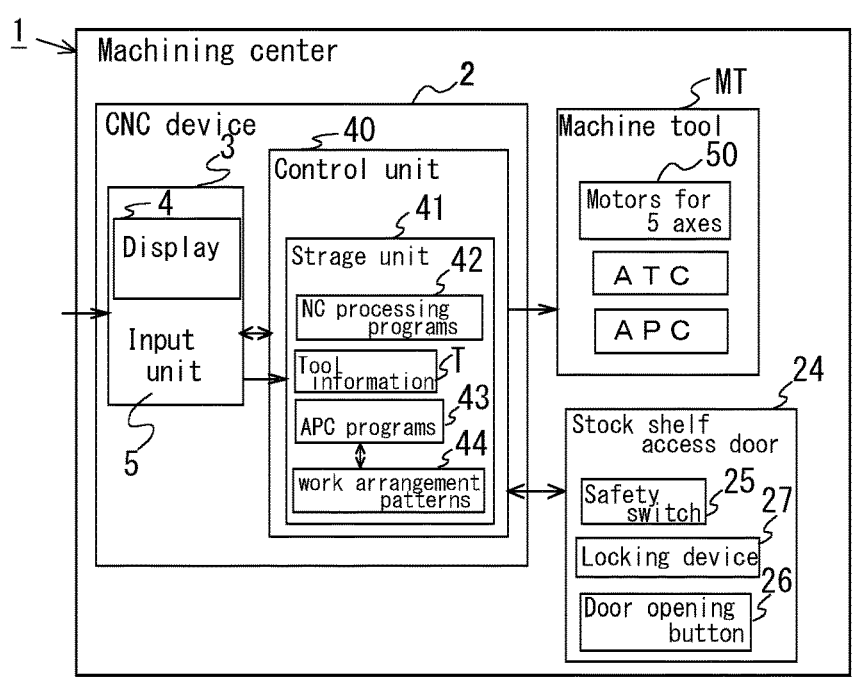
FIG. 5 is a block diagram illustrating a correlation relationship between main sections of the machining center illustrated in FIG. 1.

FIGS. 1A and 1B are perspective views illustrating the machining center including a double-sided stock shelf access door according to an embodiment of the present invention. FIG. 1A illustrates a state in which the stock shelf access door is closed. FIG. 1B illustrates a state in which the stock shelf access door is opened. FIG. 2 is a schematic plan view illustrating the inside of the processing section and the work storage section of the machining center illustrated in FIG. 1 without illustrating the automatic pallet changer. In addition, FIG. 3 is a plan view of the work storage section illustrated in FIG. 2 as viewed from above in a state in which the automatic pallet changer is arranged. FIG. 4 is a perspective view illustrating a schematic configuration of the automatic pallet changer according to the embodiment. FIG. 5 is a block diagram illustrating a correlation relationship between main sections of the machining center illustrated in FIG. 1.

The machining center 1 according to the present embodiment includes an automatic tool changer ATC and the automatic pallet changer APC in a machine tool MT, and is numerically controlled by a control unit 40 of a CNC device 2. The control unit 40 includes a storage unit 41 storing tool information T, various NC processing programs 42, an APC (Automatic Pallet Change) program 43 for automatically operating the automatic pallet changer APC in coordination with the NC processing program, and the like. The control unit 40 causes the machine tool MT to perform various types of cutting processing and processing processes in the automatic operation according to a predetermined NC processing program 42.

In the present embodiment, a processing section 10 in which cutting processing is performed on a work W and the work storage section 20 provided adjacent to the processing section 10 are integrally surrounded by a cover 6 functioning as a splash guard. The CNC device 2 is installed such that a control panel 3 for the CNC device 2 is disposed on a surface of the cover 6 in the vicinity of the processing section 10. A touch panel display 4 and an input unit 5 such as a keyboard, various buttons, or a dial are disposed on a front surface of the control panel 3.

In addition, an opening/closing window (not illustrated) that is controlled by the control unit 40 is disposed at a boundary between the processing section 10 and the work storage section 20. The opening/closing window is closed during a processing process, and is opened in the time period after the processing process and immediately before the start of a next processing process. While the opening/closing window is opened, the automatic pallet changer APC performs a replacement operation of unloading and loading works W from and to a processing table 11. In the present embodiment, the replacement operation for the works W by the automatic pallet changer APC is executed while an arm 36 of the automatic pallet changer APC holds a pallet P on which the work W is fixed.

In addition, in the processing section 10, predetermined cutting processing is performed on the work W, while the processing table 11 to which the work W is fixed is moved by the control unit 40 relative to the rotary spindle (not illustrated) to which a tool is attached. That is, while a tool necessary for the rotary spindle is replaced via the automatic tool changer ATC driven and controlled by the control unit 40, the control unit 40 controls a table drive unit 12 (motors 50) for each of 5 axes (X, Y, Z, C, and A) to move the processing table 11 by a predetermined distance along each of the coordinate axes X, Y, and Z and tilt and rotate the processing table 11 at a predetermined angle around the C and A axes so that an automatic processing process is performed on the work W.

In the present embodiment, the work storage section 20 has a substantially box(cube)-like shape and includes a flat wall surface facing the processing section 10 with the automatic pallet changer APC interposed therebetween, and a pair of inner wall surfaces 21 facing parallel to each other and extending along an orthogonal direction from both edges of the flat wall surface. A plurality of stock shelves 22 having the same elongated rectangular shape are arranged along the flat wall surface. Each of the stock shelves 22 has the same elongated rectangular shape and is detachably attached so as to be horizontally arranged between the pair of inner wall surfaces 21 via both short side portions of the stock shelf 22. In this case, all the stock shelves 22 are arranged parallel to each other at equal intervals in the vertical direction such that the sides near the processing section 10 are front surfaces and that longer sides on the rear surface side are along the flat wall surface.

In addition, a substantially cylindrical section communicating with a single corner having a substantial box-like shape is provided as a setup table 28 in the vicinity of one end of each of the stock shelves 22 in the longitudinal direction of the stock shelves 22 in the work storage section 20. The setup table 28 is surrounded by a setup table door 29 having a semi-cylindrical shape such that the setup table door 29 is openable and closable. The setup table door 29 is opened when the automatic pallet changer APC is stopped. In case a work W is supplied into the work storage section 20 from the outside, the work W is fixed to the pallet P by bolting or the like on the setup table 28. The work W which has finished being fixed to the pallet P is placed on a predetermined storage section of a stock shelf 22 by the driving of the automatic pallet changer APC after the setup table door 29 is closed. In addition, to collect a processed work W, the processed work W is transported onto the setup table 28 by the driving of the automatic pallet changer APC. After that, the setup table door 29 is opened, and the work W is taken out to the outside after being removed from the pallet P or while being fixed to the pallet P.

In the present embodiment, the stock shelf access door 24 is further provided which allows direct access to the stock shelves 22 from the outside, through which the works W can be can be taken out from and put in onto the stock shelves 22, in addition to the setup table 28. The stock shelf access door 24 is formed on the flat wall surface extending on the rear surface side of the stock shelves 22, in the cover 6 surrounding the work storage section 20. That is, an opening portion 7 where the entire surfaces of the rear surface regions of the stock shelves 22 are exposed is formed on said the flat wall surface and a pair of door members (24a and 24b) that forms a double-sided door to close the opening portion 7 such that the opening portion 7 is openable and closable is provided.

Since the stock shelf access door 24 is formed on the flat wall surface of the cover 6 surrounding the work storage section 20 having a substantially box-like shape, the pair of door members (24a and 24b) can be simply constituted by flat plate members. The pair of door members (24a and 24b) are attached so as to be able to rotate outward via hinges 23 while the left and right sides of the opening portion 7 are used as door flames. A user can hold grip portions H to manually open the pair of door members (24a and 24b) toward left and right outward directions. Therefore, when the stock shelf access door 24 is opened, all the rear surface regions of the stock shelves 22 facing the opening portion 7 can be exposed.

In addition, the pair of door members (24a and 24b) are equipped with an electromagnetic lock type locking device 27 which is unlocked by pressing a door open button 26 disposed on the outer surface of the cover and beside the stock shelf access door 24. The locking device 27 comprises an actuator fixed to rotation shafts of the door members (24a and 24b) and a device body into which the actuator is inserted with an operation of closing the door members (24a and 24b). In the device body into which the actuator is inserted by closing the stock shelf access door 24, a cam member L is rotated by the actuator and a protrusion of the cam member is in an engaged state with the actuator. When a solenoid in the device body is energized and excited, a magnetic field force pushes a locking rod forward against a biasing force of the spring, the locking rod is fitted to a recess of the cam member to block the rotation of the cam member L. The cam member L whose rotation is blocked blocks displacement of the actuator engaged with the protrusion, and the actuator that cannot be displaced blocks the driving of the rotation shafts of the door members (24a and 24b). Therefore, the door members (24a and 24b) cannot be rotated toward the opening directions and the stock shelf access door 24 is locked so as not to be openable. In addition, when the supply of power to the solenoid is blocked and the solenoid is in a non-excited state, the locking rod is retracted by the biasing force of the spring and removed from the recess of the cam member L. Therefore, the blocking of the rotation of the cam member L is released and the actuator becomes displaceable. Therefore, the door members (24a and 24b) can be rotated toward the opening directions together with the actuator, and the stock shelf access door 24 becomes unlocked and can be opened.

During the operation of the machining center 1, in the electromagnetic lock type locking device 27, a first opening/closing switch disposed in a power supply circuit for supplying power to the solenoid is in a normally closed ON state so that the stock shelf access door 24 in a normally closed state. Then, when the door open button 26 is pressed, the first opening/closing switch of the power supply circuit is opened and turned off, the supply of power to the solenoid is blocked, the solenoid becomes the non-excited state, and as described above, the stock shelf access door 24 is unlocked so as to be openable.

However, the control unit 40 includes an interlocking function. While the automatic pallet changer APC is driven, the control unit 40 disables the unlocking by the door open button 26. In the present embodiment, the control unit 40 avoids the blocking of the supply of power to the solenoid of the locking device 27. For example, a second opening/closing switch that is normally in an ON state is provided in a detour of the power supply circuit. The second opening/closing switch is closed and turned on to maintain the energized and excited state of the solenoid and disable the unlocking. In addition, the setup table door 29 may be equipped with a similar locking device, and the control unit 40 may include an interlocking function for the locking device for the setup table 28.

In addition, the control unit 40 has a safety control function of prohibiting the driving of the automatic pallet changer APC in a state in which the stock shelf access door 24 is opened. In the present embodiment, a safety switch 25 that interoperates with the electromagnetic lock type locking device 27 is used. Specifically, the safety switch 25 includes a hooking rod to be hooked on another part of the cam member L when the actuator inserted in the device body of the locking device 27 with the operation of closing the door members (24a and 24b) rotates the cam member L and becomes engaged with the cam member L. In addition, the safety switch 25 includes an electric circuit having an NC contact where an energization signal is generated in the energized state, and the spring that pushes up the hooking rod to hook on the cam member L. At the same time when the hooking rod is hooked on the cam member, the NC contact is closed and turned on, and the energization signal is transmitted to the control unit 40. On the other hand, in the unlocked state of the locking device 27, when the cam member L displaced due to the displacement of the actuator with the operation of opening the pair of door members (24a and 24b) is rotated in the opposite direction, the hooking rod is pushed down against the spring by the cam member L in contact with the hooking rod. Along with this, the NC contact is opened and turned off, so the energization signal disappears.

Therefore, while the control unit 40 detects the energization signal from the safety switch 25, the control unit 40 determines that the stock shelf access door 24 is closed. When the energization signal is not detected, the control unit 40 determines that the stock shelf access door 24 is opened, and prohibits the driving of the automatic pallet changer APC. Therefore, when an operation of replacing the works is performed in a state in which the stock shelf access door 24 is opened, or another operation is performed, the risk of the automatic pallet changer APC being driving to interfere with an operator is avoided and safety is ensured.

The automatic pallet changer APC is disposed at a position where the automatic pallet changer APC transports and replaces the works W between the stock shelves 22 within the work storage section 20 and the processing table 11. The automatic pallet changer APC rotates the arm 36 for detachably holding the pallet P around a vertical axis (vertical center axis of a strut described below in the present embodiment) by a turning drive mechanism, moves the arm 36 in a vertical direction along the vertical axis by a lifting drive mechanism, and moves the arm 36 in the front-rear direction orthogonal to the longitudinal sides of the stock shelves 22 by a telescopic drive mechanism. In the present embodiment, the automatic pallet changer APC further moves the arm 36 in a left-right direction along longitudinal sides of the stock shelves 22 on the front surface side of the stock shelves 22 by a horizontal drive mechanism.

Specifically, a base 31 of the automatic pallet changer APC is disposed on a floor surface of the work storage section 20, and a strut 33 is standing on the base 31 via a strut supporting base 32 and extends in the vertical direction. In addition, base guide rails 31G are disposed on the base 31 and extend in parallel to each other along the longitudinal side of each stock shelf 22. Rotational motion of a horizontal drive motor M1 is transmitted as linear motion by a ball screw mechanism to the strut supporting base 32 slidably fitted to the base guide rails 31G, so that the strut 33 can be moved together with the strut supporting base 32 along the base guide rails 31G in the left-right horizontal direction.

Upper guide rails 34G are disposed in parallel to each other along the longitudinal side of each stock shelf 22 above the work storage section 20. The upper end of the strut 33 is supported by the upper support portion 34 slidably fitted to the upper guide rails 34G. Therefore, the strut 33 is horizontally moved stably while the upper and lower ends of the strut 33 are supported between the upper guide rails 34G and the base guide rails 31G.

Lifting guide rails 33G extending in the vertical direction are formed on the strut 33. The arm 36 for holding the pallet P is coupled to the strut 33 via an arm support portion 35 slidably fitted to the lifting guide rails 33G. The arm support portion 35 to which the rotational motion of the lifting drive motor M2 is transmitted as vertical linear motion by the ball screw mechanism moves along the lifting guide rails 33G in the vertical direction to lift up and down the arm 36.

The arm 36 is slidably supported along a slide guide 35S of the arm support portion 35. The arm 36 to which the rotational motion of the telescopic motor M3 is transmitted as linear motion via gears is telescopically moved along the slide guide 35S of the arm support portion 35 in the front-rear direction orthogonal to the strut 33. In addition, the strut 33 is rotatably supported by the upper support portion 34 and the strut supporting base 32 so as to be rotatable about its vertical central axis, and is rotated by transmission of the rotation motion of the turning drive motor M4. Therefore, the arm support portion 35 and the arm 36 supported by the strut 33 are turned around the vertical central axis of the strut 33.

In the automatic pallet changer APC having the above-described configuration, in order for the arm 36 to access a target address of the stock shelf 22 or the processing table 11 and hold and release the pallet P with a target work W fixed thereto, each of the drive motors is driven and controlled by the control unit 40 to lift up and down the arm 36, move the arm 36 toward the horizontal left and right directions, turn the arm 36, and move the arm 36 in the front-rear direction along a predetermined course.

In a case where a process of continuously processing a large number of the works W is performed, a series of replacement operations of unloading the processed work W from the processing table 11, returning the processed work W to a storage section with a predetermined address on the stock shelf 22, loading an unprocessed work W stored on another storage section on the stock shelf 22 onto the processing table 11, and fixing the unprocessed work W to the processing table 11 is performed by the control unit 40 according to the APC program 43. The APC program 43 is set in advance such that this replacement operation is efficiently completed in coordination with the processing process by the NC processing program 42.

In the present embodiment, when all the works W stored on all the stock shelves 22 are replaced with the processed works W, the executed APC program 43 is temporarily ended. After the unprocessed works W are newly supplied to all the stock shelves 22, the same APC program 43 is executed again to perform the same continuous processing process. Therefore, after the first APC program is ended, the stock shelf access door 24 is opened, and all the processed works W are directly completely replaced at once. After that, the control unit 40 confirms that the stock shelf access door 24 has been closed, executes the next APC program 43, and executes the NC processing program again.

Figure 6:
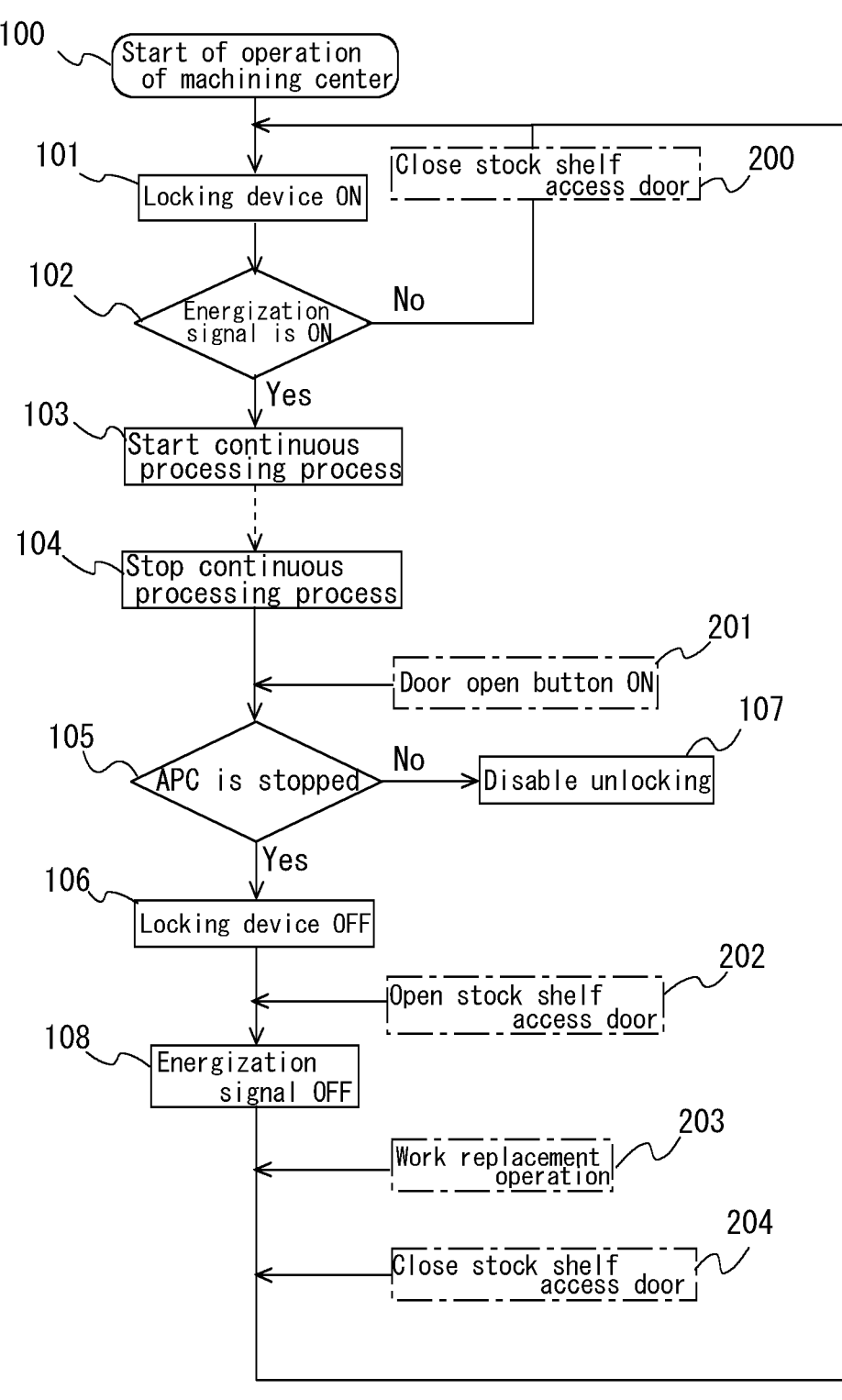
FIG. 6 is a flowchart illustrating an operation of an interlocking function in the machining center illustrated in FIG. 1.

An example of operations of the interlocking function and the safety control function by the control unit 40 of the machining center 1 according to the present embodiment is described with reference to a flowchart of FIG. 6. First, as the start of the operation of the machining center 1 (step 100), a main power source is turned on in a state in which the stock shelf access door 24 is closed. When the stock shelf access door 24 is closed, the actuator fixed to the door members (24a and 24b) is inserted into the device body of the locking device 27, rotates the cam member L so as to be engaged with the cam member L, and positions the cam member L at an angle where the recess of the cam member L can be fitted by the locking rod of which is the movable iron core of the solenoid. After the main power source is turned on, the supply of power to the locking device 27 is started as an operation of turning on the locking device (step 101), but the supply of power to an energization circuit of the safety switch 25 is also started. The control unit 40 checks whether an energization signal from the safety switch 25 is ON (step 102). When the stock shelf access door 24 is closed, the actuator fixed to the door members (24a and 24b) is inserted into the device body of the locking device 27 and rotates the cam member L so as to be engaged with the cam member L, the hooking rod of the safety switch 25 is lifted up and hooked on the cam member L, the energization circuit is turned on at the NC contact, and the energization signal flows through the energization circuit. The control unit 40 detects a communication signal and determines that the stock shelf access door 24 is closed.

However, while the stock shelf access door 24 is opened, the actuator has not been inserted to a predetermined position in the locking device 27 and will not rotate the cam member L to a predetermined angle. Therefore, the hooking rod of the safety switch 25 remains pushed down and the NC contact of the energization circuit remains OFF in an open state, and the energization signal remains OFF. In this case, since the recess of the cam member L is not located at a fitting position, even if the locking rod is moved forward by the excitation of the solenoid, the rotation of the cam member L cannot be blocked by the locking rod, and the locking device 27 does not become the locked state. Therefore, since the energization signal from the safety switch 25 is not detected, the control unit 40 determines that the stock shelf access door 24 is opened, and turns on a display lamp or the like to notify the operator that the stock shelf access door 24 is opened. The operator closes the stock shelf access door 24 after checking the turning on of the lamp or the like (step 200).

When the control unit 40 detects the energization signal from the safety switch 25, the control unit 40 determines that the stock shelf access door 24 is closed. In this case, it is determined that the locking device 27 reaches the locked state. That is, since the cam member L is positioned at the predetermined angle by the insertion of the actuator, the locking device 27 can fit the locking rod moved forward by the excitation of the solenoid to the recess of the cam member L, and blocks the rotation of the cam member L. So the cam member L blocks the displacement of the actuator, and stops the rotation of the door members (24a and 24b), and the stock shelf access door 24 is in the locked state so as not to be openable.

The control unit 40 instructs the machine tool MT to start the continuous processing process (step 103), drives and controls the automatic tool changer ATC according to the predetermined NC processing program, drives and controls the automatic pallet changer APC according to a predetermined APC program, sequentially loads the unprocessed works W from all the stock shelves 22 onto the processing table 11, and continuously performs a predetermined processing process on the unprocessed works W.

When all the works W stored on the stock shelves 22 are replaced with the processed works W, the control unit 40 provides an instruction to stop the continuous processing process (step 104). In this case, the transport process by the automatic pallet changer APC according to one APC program 43 is ended and the driving of the automatic pallet changer APC is stopped. The operator performs an operation of turning on the door open button 26 (step 201) for unlocking. By this operation, the first opening/closing switch of the power supply circuit for supplying power to the solenoid of the locking device 27 is opened and turned off, the supply of power to the solenoid is blocked such that the solenoid is shifted to the non-excited state. In this case, the control unit 40 checks the stop of the automatic pallet changer APC (step 105). When the automatic pallet changer APC is being driven, the control unit 40 disables the unlocking (step 107), closes and turns on the second opening/closing switch in the opened state in the detour of the power supply circuit, maintains the energized and excited state of the solenoid in the locking device 27, and maintains the locked state.

When the automatic pallet changer APC is in the stopped state, the control unit 40 opens and turns off the second opening/closing switch so as to enable the unlocking by blocking the power supply when the first opening/closing switch of the power supply circuit is turned off. Therefore, in the power supply circuit, the first opening/closing switch is turned off so as to be in the de-energized state in coordination with the operation of turning on the door open button 26, and the solenoid of the locking device 27 is shifted to the non-excited state. Thereby, the locking rod is retracted by the biasing force of the spring such that the locking rod is disengaged from the recess of the cam member L, the cam member L becomes rotatable, the actuator becomes displaceable, and the locking device is turned off (step 106). Therefore, the door members (24*a* and 24*b*) become rotatable together with the actuator. When the operator holds the grip portions H and pulls the grip portions H forward, the stock shelf access door is opened (step 202). In this case, the safety switch 25 that interoperates with the cam member L is blocked the supply of power and turns off the energization signal (step 108).

The operator can proceed with the work replacement operation (step 203) at once by opening the stock shelf access door 24. That is, the operator takes out all the processed works W fixed to pallets P directly from each of the pallet storage jigs J through the opening portion 7 where the rear surface regions of all the stock shelves 22 are exposed, and seats the unprocessed works W instead. After the work replacement operation is ended, when the stock shelf access door 24 is closed (step 204), and thus the locking device 27 can be locked and the energization signal flows through the safety switch 25. The control unit 40 confirms that the energization signal is ON (step 102), and detects the energization signal, thereby determining that the stock shelf access door 24 is closed. Therefore, the control unit 40 starts the next continuous processing process (step 103). As described above, since the replacement of all the works can be completed at once, a waiting period until the start of the next continuous processing process is very short.

In the present embodiment, in the pair of inner wall surfaces 21 between which the stock shelves 22 at the stages are horizontally arranged, as a pair of shelf attachment portions for detachably attaching both short sides of each stock shelf 22, a pair of screw holes N to which the short sides of each of the stock shelves 22 are fixed are formed at the same height. The pairs of the screw holes are arranged at equal intervals such that the stock shelves 22 at the plurality of the stages are arranged at equal intervals in the vertical direction. When two or more types of equal intervals are provided, the stock shelves 22 can be arranged at the two or more different types of equal intervals in the vertical direction and thus it is possible to select an interval and change the intervals according to the maximum height dimension among dimensions of the unprocessed target works W. Actually, the screw holes N are formed in the pair of inner wall surfaces 21 at equal intervals.

The shelf attachment portions are not limited to screwing with the screw holes and may be another mechanism as long as both short sides of each of the stock shelves 22 can be detachably attached to the pair of inner wall surfaces 21. However, it is desirable that the configuration and detachment operation be simple. For example, the pair of inner wall surfaces 21 may be provided with vertical struts facing each other and the each vertical strut can have grooves at same level as each other into which both short sides of each of the stock shelves 22 are inserted in the horizontal direction as shelf attachment portions. In this case, the stock shelves 22 can be supported and fixed only by sliding and inserting both short sides of each of the stock shelves 22 into the corresponding grooves. In addition, for more stable attachment, both the grooves and the above-described screw holes N can be used.

In addition, in order to store the works W on the stock shelves 22 via the pallets P, each of the pallet storage jigs J detachably attached to the stock shelves 22 has a fitting recess in which a fitting protrusion f of the bottom surface of the pallet P is removably inserted and seated such that the bottom surface of the pallet is supported by a peripheral region of the fitting recess. In the present embodiment, the pallet storage jigs J are used, each consisting primarily an annular member. A notch portion is provided in a front surface of the annular member as an arm passage portion k into which the arm 36 of the automatic pallet changer APC is removably inserted and that is movable in the vertical direction such that the pallet P can be lifted up and detached and lifted down and seated.

As a mechanism for disposing each pallet storage jig J on each stock shelf 22, a protruding engagement portion (not illustrated) is provided on the bottom surface of each pallet storage jig J, a through-hole (not illustrated) into which the engagement portion is inserted is provided in each stock shelf 22, and the engagement portion inserted in the through-hole is screwed and fixed from the rear surface side of the stock shelf 22, for example. In this case, through-holes are provided at different types of equal intervals in each of the stock shelves 22, and the pallet storage jigs J can be mounted so that the intervals between the pallet storage jigs J along the longitudinal direction of the stock shelves 22 can be changed according to the width of each work W.

In the present embodiment, since it is possible to change the intervals between the stock shelves in the vertical direction and it is possible to change the juxtaposition intervals between the pallet storage jigs J on the stock shelves 22 in the horizontal direction, a plurality of different work arrangement patterns can be set, and a pattern suitable for the size of the work W can be selected. For example, as illustrated in FIG. 7A, according to the height and width of each work W, a first arrangement pattern for storing 25 pallets can be set by arranging pallet storage jigs J in 5 rows on each of the stock shelves 22 arranged in 5 stages, the 5 rows×the 5 stages. In addition, as illustrated in FIG. 7B, when the width of each work W is the same as that in the case where the first arrangement pattern is used, and the height of each work W is relatively smaller than that in the case where the first arrangement pattern is used, a second arrangement pattern in which the pallet storage jigs J are arranged in 5 rows on each of the stock shelves arranged at 6 stages, the 5 rows×the 6 stages, and the 30 pallets are stored can be set. In addition, as illustrated in FIG. 7C, when the height of each work W is the same as that in the case where the first arrangement pattern is used, and the width of each work W is relatively larger than that in the case where the first arrangement pattern is used, a third arrangement pattern in which the pallet storage jigs J are arranged in 4 rows on each of the stock shelves arranged at 5 stages, the 4 rows×the 5 stages, and the 20 pallets are stored can be set. In addition, as illustrated in FIG. 7D, when the height of each work W is relatively smaller and the width of each work W is relatively larger than those in the case where the first arrangement pattern is used, a fourth arrangement in which the pallet storage jigs J are arranged in 4 rows on each of the stock shelves arranged at 6 stages, the 4 rows×the 6 stages, and the 24 pallets are stored can be set.

Therefore, in the present embodiment, in the storage unit 41 of the control unit 40, a plurality of conceivable work arrangement patterns are stored so as to be selectable and APC programs 43 in which access route information for each of the work arrangement patterns is incorporated are stored. Therefore, the control unit 40 can select an APC program corresponding to a specified work arrangement pattern and can cause the automatic pallet changer APC to automatically transport works W with high accuracy according to the APC program.

Since the numbers of the pallets P and the works W and arrangement addresses are different for the different work arrangement patterns described above, sets of access routes of the arm 36 by the driving of the automatic pallet changer APC to all the pallets P differ for each of the work arrangement patterns. Therefore, in the storage unit 41 of the control unit 40, a plurality of work arrangement patterns 44 set in advance so as to be selectable are stored, and the APC programs 43 that have access route information incorporated therein for each work arrangement pattern are stored.

Therefore, when an arrangement pattern of the pallets P and the works W actually stored on all the stock shelves 22 in the work storage section 20 is specified from among the work arrangement patterns 44 stored in the storage unit 41 before the start of the processing process, the control unit 40 selects an appropriate corresponding APC program 43 from among the APC programs 43 stored in the storage unit 41 and can apply the selected APC program 43 to the actual processing process. That is, the control unit 40 drives and controls the drive mechanisms such as each motor of the automatic pallet changer APC based on predetermined access route information according to the selected APC program in the time period from the end of each processing process to the start of each processing program while executing a predetermined NC processing program, whereby the replacement of the processed works with the unprocessed works W between the processing table 11 and each of the storage sections of the stock shelves 22 can be sequentially performed with high accuracy.

The invention claimed is:

1. A machining center including:
  a machine tool;
  a work storage section for storing works and pallets;
  a computerized numerical control (CNC) device that performs numerical control on the machine tool; and
  an automatic tool changer,
  wherein
  a processing section of the machine tool is provided adjacent to the work storage section, and the work storage section and the processing section are integrally surrounded by a cover,
  in the processing section, a processing table is provided, to which processing table one of the works which is a work to be processed is fixed via one of the pallets, and
  in the processing section, a rotary spindle is provided, to which rotary spindle any one of various tools that perform cutting processing on the work fixed to the processing table are selectively attached via the automatic tool changer such that the various tools can be replaced,
  the work storage section includes an automatic pallet changer that loads and unloads the one of the works and the one of the pallets to and from the processing table,
  the work storage section also includes stock shelves that are disposed at a plurality of heights, wherein the stock shelves are disposed such that the automatic pallet changer is interposed between the stock shelves and the processing section, wherein a plurality of the pallets are removably stored on the stock shelves, and
  the work storage section also includes a setup table that is disposed near a respective one longitudinal end of each of the stock shelves and on which setup table the works are fixed to and removed from the pallets, and via which setup table the works are taken in and out of the work storage section from the outside of the work storage section,
  the computerized numerical control device includes a control unit being configured to drive and control drive units of the processing table and of the rotary spindle and of the automatic tool changer, according to a predetermined processing instruction, to execute cutting processing on one of the works, and to execute replacing the tool that is attached to the rotary spindle with a certain tool and attaching the certain tool to the rotary spindle according to each processing process indicated in the processing instruction,
  wherein the control unit is configured to drive and control the automatic pallet changer to exchange the pallet, fixed to the processing table and to which the processed work is fixed, with one of the pallets, to which an unprocessed one of the works is fixed, that is stored on the stock shelves,
  a control panel for the computerized numerical control device is disposed on an outer surface of the cover in the vicinity of the processing section, wherein
  the cover includes
    an opening portion where rear surface regions of the stock shelves are exposed to a region located on the rear side of the stock shelves,
    a stock shelf access door that closes the opening portion such that the rear surface regions of the stock shelves are not exposed to the region that is located on the rear side of the stock shelves, which stock shelf access door is driven to be opened and closed,
    a locking device that stops the opening and closing driving of the stock shelf access door,
    an unlocking mechanism that is operable from the outside of the cover and releases the stopping by the locking device of the opening and closing driving of the stock shelf access door, and
    a door opening/closing detection device that detects an opened or closed state of the stock access door and outputs a detection signal,
  the control unit is configured to further carry out:
    an interlocking function that enables the unlocking mechanism to operate while the automatic pallet changer is stopped, and disables operation of the unlocking mechanism while the automatic pallet changer is driven, and
    a safety control function that determines, based on the detection signal, whether the stock shelf access door is in the opened state or the closed state, and prohibits a drive unit of the automatic pallet changer from being driven when the stock shelf access door is in the opened state.

2. The machining center according to claim 1, wherein each of the stock shelves has the same outer rectangular shape,
  the work storage section has a substantially box-like shape including a flat wall surface along a longitudinal side of the rectangular shape of each of the stock shelves on a rear side of each of the stock shelves, and
  a region of the cover that has the opening portion and that has the stock shelf access door is present on the flat wall surface.

3. The machining center according to claim 2, wherein each of the same outer rectangular shapes of the stock shelves includes a respective pair of shorter sides and a respective pair of longer sides,
  the cover surrounding the work storage section includes a pair of inner wall surfaces facing parallel to each other between which inner wall surfaces the stock shelves are horizontally arranged in the longitudinal direction, and
  the pair of inner wall surfaces includes a plurality of pairs of shelf attachment portions that enable the shorter sides of each of the stock shelves to be detachably attached to the pair of inner wall surfaces at the same height, wherein the pairs of shelf attachment portions are formed at two or more equal intervals in a vertical direction such that the stock shelves are able to be attached to the inner wall surfaces at intervals that are selectable and changeable.

4. The machining center according to claim 2, wherein the automatic pallet changer includes:

an arm for detachably holding one of the pallets, a turning drive mechanism that rotates the arm around a vertical axis, a lifting drive mechanism that moves the arm in a vertical direction along the vertical axis, a horizontal drive mechanism that moves the arm in a left-right direction along the longitudinal side of each of the stock shelves on a front side of each of the stock shelves, and a telescopic drive mechanism that moves the arm in a front-rear direction orthogonal to the longitudinal side of each of the stock shelves.

5. The machining center according to claim 4, wherein each of the pallets includes a respective fitting protrusion protruding downward from a respective bottom surface of the corresponding pallet, each of the stock shelves includes a plurality of pallet storage jigs where ones of the pallets are seated, the plurality of pallet storage jigs are removably arranged at two or more equal intervals along the corresponding stock shelf longitudinal side, which two or more equal intervals are selectable and changeable, and each of the pallet storage jigs has a respective fitting recess into which the corresponding fitting protrusion of any of the pallets is removably inserted such that the corresponding bottom surface of the corresponding pallet is supported by the corresponding pallet storage jig, each of the pallet storage jigs is configured to be detachably attached to one of the stock shelves, and each of the pallet storage jigs has a respective arm passage portion into which the arm of the automatic pallet changer is removably insertable and which permits vertical movement of the arm so that the corresponding pallet can be lifted.

* * * * *